United States Patent
Mangiagli et al.

(10) Patent No.: US 8,857,592 B2
(45) Date of Patent: Oct. 14, 2014

(54) CLUTCH ASSEMBLY PERFORMANCE ENHANCEMENT APPARATUS AND METHOD

(75) Inventors: Todd V. Mangiagli, Putney, VT (US); Gregg A. Nader, Libertyville, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 250 days.

(21) Appl. No.: 13/180,585

(22) Filed: Jul. 12, 2011

(65) Prior Publication Data

US 2013/0015032 A1  Jan. 17, 2013

(51) Int. Cl.
*F16D 13/71* (2006.01)
*F16D 13/38* (2006.01)
*F16D 13/68* (2006.01)

(52) U.S. Cl.
CPC ............ *F16D 13/683* (2013.01); *Y10S 192/01* (2013.01)
USPC ............... 192/70.13; 192/DIG. 1; 192/85.24; 29/402.03

(58) Field of Classification Search
USPC ............................................ 192/70.11, 70.13
See application file for complete search history.

(56) References Cited

U.S. PATENT DOCUMENTS

| 994,141 | A | * | 6/1911 | Fletcher | 192/70.12 |
|---|---|---|---|---|---|
| 2,811,234 | A | * | 10/1957 | Matrau | 192/70.13 |
| 4,509,626 | A | * | 4/1985 | Jones | 192/85.42 |
| 5,322,148 | A | * | 6/1994 | Fernandez | 192/70.13 |
| 6,398,531 | B1 | * | 6/2002 | Andres et al. | 418/69 |
| 6,553,643 | B2 | * | 4/2003 | Relan et al. | 29/464 |
| 6,920,970 | B1 | * | 7/2005 | Dumas | 192/85.41 |
| 2008/0167157 | A1 | * | 7/2008 | Creighton et al. | 475/269 |

OTHER PUBLICATIONS

Single posting from http://www.advrider.com (Sep. 21, 2010).*

* cited by examiner

*Primary Examiner* — Gene Crawford
*Assistant Examiner* — Mark Manley
(74) *Attorney, Agent, or Firm* — Downs Rachlin Martin PLLC

(57) ABSTRACT

A kit for improving the performance of a clutch assembly, including at least one steel plate configured and dimensioned to be received through the open end of the housing and disposed in mating relationship with a terminal one of the plural friction elements, at least one friction disk configured and dimensioned to be received through the open end of the housing and disposed in mating relationship with the at least one steel plate to form in combination with the plural friction elements and plural steel plates an extended interleaved stack, with the at least one friction disk forming a new terminal friction element, and a retaining ring configured and dimensioned to be secured over the open end of the housing and including an integrally formed, annular inner friction surface adapted to confront the new terminal friction element to directly receive forces applied through the clutch assembly.

3 Claims, 3 Drawing Sheets

CLUTCH ASSEMBLY PERFORMANCE ENHANCEMENT APPARATUS AND METHOD

FIELD OF THE INVENTION

The present invention generally relates to the field of clutches. In particular, the present invention is directed to a clutch assembly performance enhancement apparatus and method.

BACKGROUND

Transmissions include, among other components, a clutch assembly. The interposition of the clutch assembly between a drive shaft and a driven shaft permits the drive shaft, connected to a motor or an engine, to be coupled, releasably, to the driven shaft. This coupling through the clutch assembly may cause the driven shaft to rotate at the same rate as the drive shaft. It may also enable a driven shaft to rotate at a different rotation rate as the drive shaft, or be completely decoupled from the driven shaft.

One component of the clutch assembly that enables the releasable coupling of the drive shaft to the driven shaft is a stack of friction elements interleaved with steel plates. This interleaved stack can transfer torque from the drive shaft to the driven shaft, or it can be decoupled from one of the shafts, thereby preventing the transfer of torque. Given this arrangement, a clutch assembly is limited in the amount of torque that it can transfer from the driven shaft to the drive shaft in part by the torque that the interleaved stack can withstand: When an upper torque limit is exceeded, the interleaved disks can slip with respect to one another, allowing the clutch to slip excessively, degrading performance and increasing wear.

SUMMARY OF THE DISCLOSURE

In one implementation, the present disclosure is directed to a kit for improving the performance of a clutch assembly. The clutch assembly comprises an input housing configured to receive an interleaved stack of plural friction elements and plural steel plates through an open end of said housing, said kit comprising at least one steel plate configured and dimensioned to be received through said open end of said housing and disposed in mating relationship with a terminal one of said plural friction elements; at least one friction disk configured and dimensioned to be received through said open end of said housing and disposed in mating relationship with said at least one steel plate to form in combination with said plural friction elements and plural steel plates an extended interleaved stack, with said at least one friction disk forming a new terminal friction element; and a retaining ring configured and dimensioned to be secured over said open end of said housing and including an integrally formed, annular inner friction surface adapted to confront the new terminal friction element to directly receive forces applied through the clutch assembly.

In another implementation, the present disclosure is directed to a kit for improving the performance of a clutch assembly. The clutch assembly comprising an input housing configured to receive an interleaved stack of plural friction elements and plural steel plates through an open end of said housing, said kit comprising an apply-plate having an annular recessed face disposed on a surface of said apply-plate, said apply plate positioned to cooperate with an apply-ring, the apply-ring disposed within the input housing; at least one steel plate configured and dimensioned to be received through said open end of said housing and disposed in mating relationship with a terminal one of said plural friction elements; at least one friction disk configured and dimensioned to be received through said open end of said housing and disposed in mating relationship with said at least one steel plate to form in combination with said plural friction elements and plural steel plates an extended interleaved stack, with said at least one friction disk forming a new terminal friction element; and a retaining ring configured and dimensioned to be secured over said open end of said housing and including an integrally formed, annular inner friction surface adapted to confront the new terminal friction element to directly receive forces applied through the clutch assembly.

In yet another implementation, the present disclosure is directed to a method of improving the performance of a clutch assembly. The clutch assembly comprising a stack of interleaved plural friction disks and plural steel plates, and a housing configured to receive an interleaved stack of plural friction elements and plural steel plates through an open end of said housing, said method comprising fabricating a receiving surface on the open end of the housing; inserting at least one additional friction disk into the clutch assembly housing, the additional friction disk configured and dimensioned to be received through said open end of said housing and disposed in mating relationship with said at least one steel plate to form in combination with said plural friction elements and plural steel plates an extended interleaved stack, with said at least one friction disk forming a new terminal friction element; inserting at least one additional steel plate into the clutch assembly configured and dimensioned to be received through the open end of the housing and disposed in mating relationship with a terminal one of the plural friction elements; and enclosing the receiving end of the clutch assembly housing using a retaining ring mounted to the receiving surface, a friction surface formed on an inner side thereof and adapted to directly receive forces applied through the clutch assembly.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Embodiments of the present invention disclosed herein include apparatus and methods for making and using a kit to improve the performance of a clutch assembly used as part of a drive-train that is connected to a motor or an engine. Certain exemplary embodiments disclosed herein are particularly well suited for use with the following General Motors transmissions: 700-R4/4L60 from production year 1982 to production year 1993; 4L60E from production year 1992 to at least production year 2010; 4L65E from production year 2001 to production year 2005; and 4L70E from production year 2005 to at least production year 2010. While these transmissions are identified, those skilled in the art will appreciate that the teachings of the present disclosure are not limited to these transmissions, nor limited to vehicle transmissions generally. Indeed, the broad concepts of the present disclosure may be applied to any of a number of systems in which a motor or engine drives a drive shaft that, in turn, is connected to a driven shaft via a clutch assembly.

In the exemplary embodiments disclosed herein, a kit may be used to improve the performance of a clutch assembly, including increasing the upper toque limit, by, in one embodiment, modifying an existing clutch to permit additional friction elements and additional steel plates to be added to an interleaved stack. In another exemplary embodiment, the kit may be used to improve the performance of a clutch assembly by rigidly connecting a retaining ring to a modified input housing in order to add an additional friction element to the interleaved stack without occupying any of the limited volume within the clutch assembly housing. The rigid connection of the retaining ring to the modified input housing may also improve the performance of the clutch assembly by increasing the amount of pressure that the retaining ring can withstand before unintentionally separating from the modified input housing.

Figure 1:
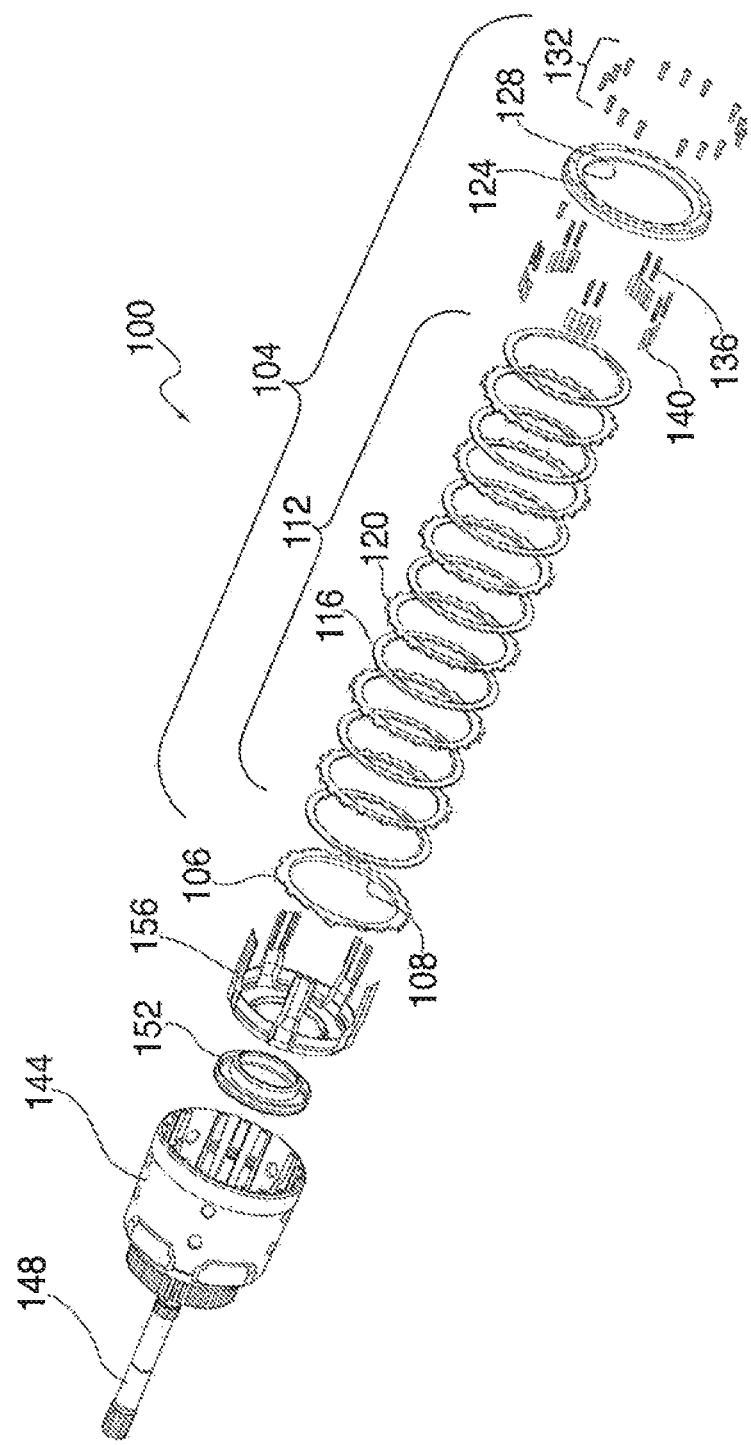
FIG. 1 is an exploded isometric view of an exemplary embodiment of a clutch assembly.

Turning now to the figures, FIG. 1 depicts an exploded isometric view of clutch assembly 100 that includes clutch kit 104. Clutch kit 104 may be used to improve, for example, the upper torque limit of clutch assembly 100. Kit 104 includes an apply-plate 106 having an annular recessed face 108 (also shown in FIG. 2), an interleaved stack 112 of friction elements 116 and steel plates 120, a retaining ring 124 that includes an inner friction surface 128, bolts 132, springs 136, and spring guides 140.

Components of kit 104 are in mechanical communication with various elements of clutch assembly 100, including modified input housing 144. Modified input housing 144 houses the components of clutch assembly 100, including the components of kit 100, and is in mechanical communication with drive shaft 148 and the driven shaft. While in one exemplary embodiment, the diameter of modified input housing 144 may be approximately six inches, those skilled in the art will appreciate that other examples can range in diameter from only one or two inches to over twelve inches, depending on the application. Furthermore, as those skilled in the art will appreciate, modified input housing 144 can be fabricated from any number of materials including aluminum, aluminum alloys, steel, and steel alloys including stainless steel. As known to those skilled in the art, these materials can be cast, machined, rolled, or otherwise fabricated to meet the design criteria of the specific application.

Components of kit 104 are also in mechanical communication with other mechanical components of clutch assembly 100 including an apply-piston 152, an apply-ring 156, and other elements necessary for the operation of a clutch not shown or described herein, but well known to those skilled in the art. In the exemplary embodiment depicted in FIG. 1, apply-piston 152, apply-ring 156, and apply-plate 106 can cooperate in order engage or disengage interleaved stack 112, thereby coupling or decoupling drive shaft 148 from the driven shaft.

One exemplary mechanism by which kit 104 can increase the upper torque limit of clutch assembly 100 is to replace OEM clutch assembly components with analogous components having reduced thicknesses compared to the OEM clutch components in order to reallocate space within modified input housing 144 from these components to additional friction elements 116 and/or steel plates 120 of interleaved stack 112. In one such exemplary embodiment, apply-plate 106, as an element of kit 104, is thinned in comparison to a conventional apply-plate in order to increase the space within modified input housing 144 available for additional friction elements 116 and/or steel plates 120. The addition of friction elements 116 and/or steel plates 120, can increase the upper torque limit of clutch assembly 100. In this example, apply-plate 106 has a thickness of approximately 0.2 inches to approximately 0.5 inches, an outer diameter of approximately 5 inches to approximately 6 inches, and a width of approximately 0.5 inches. As described above, those skilled in the art will appreciate that these dimensions can be varied as required by the particular design requirements of a clutch assembly without departing from the concepts of the present disclosure. In other examples, OEM friction elements and steel plates may be replaced by friction elements 116 and steel plates 120 having reduced thicknesses compared to their OEM analogues, permitting additional friction elements and steel plates to be inserted into modified input housing 144, and thereby improving the upper torque limit attainable by clutch assembly 100.

Figure 2:
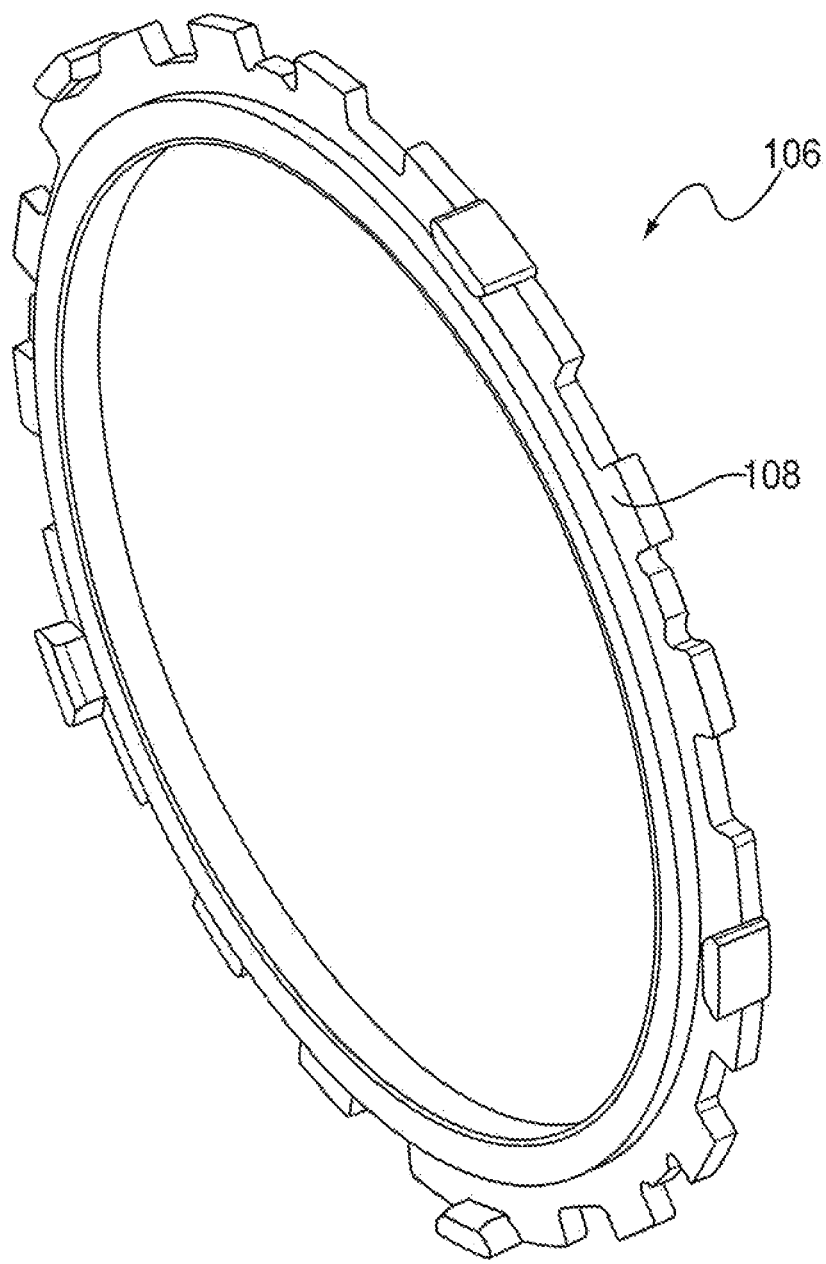
FIG. 2 is a perspective view of an exemplary embodiment of a modified apply-ring having an annular recessed face.

Continuing with this exemplary embodiment, apply-plate 106 may include an annular recessed face 108, as shown in FIG. 2, disposed on a surface of the apply-plate that is substantially concentric with the circumference of the apply-plate. Annular recessed face 108 may mate with apply-ring 156 upon actuation of the apply-piston 152. Annular recessed face 108, because of its reduced thickness when compared to the non-recessed portion of apply-plate 106, provides space within modified input housing 144 that may be reallocated to additional friction elements 116 and/or steel plates 120 by, for example, reducing the spacing between apply-piston 152, apply-ring 156, and apply-plate 106. The reduced thickness of apply-plate 106 only at annular recessed face 108 enables the apply-plate to remain sufficiently rigid because of the larger thickness region of the apply-plate bordering the annular recessed face. This additional rigidity can maintain proper functioning of apply-plate 106 even under high operating loads exerted on the apply-plate by apply-piston 152 and apply-ring 156. Apply-plate 106, as well as apply-piston 152 and apply-ring 156, can be fabricated from any number of materials including aluminum, aluminum alloys, steel, and steel alloys including stainless steel. As known to those skilled in the art, these materials can be cast, machined, rolled, or otherwise fabricated to meet the design criteria of the clutch assembly.

Apply-plate 106 may also be in mechanical communication with return spring 136. Return spring 136 may be guided by a spring retainer 140 and in communication with both apply-plate 106 and retaining ring 124. The urging force provided by return spring 136 may return apply-plate 106 to a default position after the apply-plate is moved by apply-piston 152 that has been actuated so as to move apply-ring 156. In this example, return spring 136 can be approximately 1.2 inches to approximately 1.5 inches in length, with a load of approximately 2 pounds to 2.5 pounds at approximately 1.2 inches, and a load of approximately 4 pounds to 6 pounds at approximately 1.1 inches. Those skilled in the art will appreciate that return spring 136 can be designed to a wide variety of dimensions and loads depending on the design features needed for its performance as part of kit 104.

In another exemplary embodiment of the present invention, an inner friction surface 128 is added to the side of retaining ring 124 facing interleaved stack 112, thereby providing an additional element of the interleaved stack that can, in turn, increase the upper torque limit of the clutch assembly. Providing inner friction surface 128 disposed on the interleaved-stack-face of retaining ring 124 is a spatially-efficient manner of providing the additional friction element because the underlying structural support for the friction element, that is the retaining ring, does not occupy space within modified input housing 144. This in turn, can preserve space within modified input housing 144 for even more additional friction elements 116 and/or steel plates 120, thereby further increasing the upper torque limit of the clutch assembly.

Figure 3:
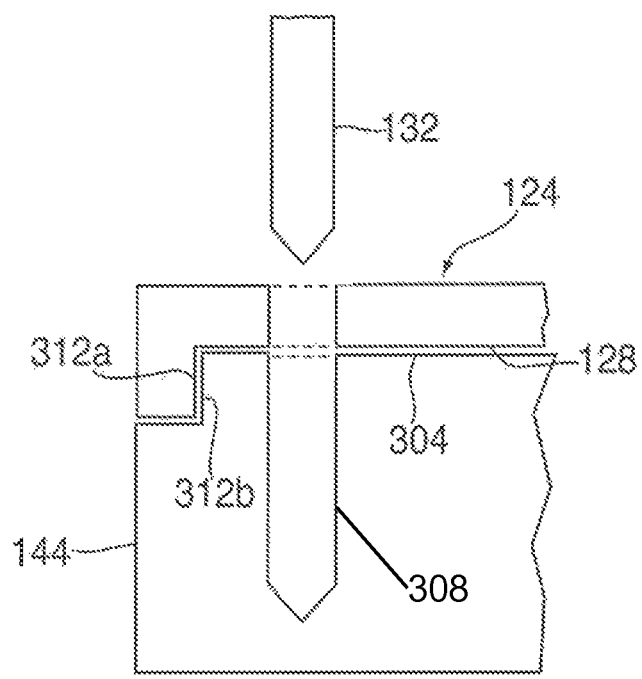
FIG. 3 is a cross-sectional view of a portion of a modified input housing and a retaining ring, each having mating alignment features.

As shown in FIG. 3, another mechanism by which kit 104 can improve the performance of clutch assembly 100 is to connect modified input housing 144 and retaining ring 124 using connecting means that contribute to an increase of the upper torque limit of the clutch assembly. In one exemplary embodiment, modified input housing 144 and retaining ring 124 can be connected using bolts 132. Bolts 132 provide a rigid connection between modified input housing 144 and retaining ring 124, thereby enabling the retaining ring to receive increased forces transferred to it by interleaved stack 112 without failing. In this example, and as shown in FIG. 3, the connection between modified input housing 144 and retaining ring 124 is facilitated by creating a receiving surface 304 on modified input housing 144. Receiving surface 304 is a generally flat surface, fabricated by machining modified input housing 144, on which retaining ring 124 is placed. Furthermore, receiving surface 304 contains threaded bores 308 that may be used to receive bolts 132 that rigidly connect retaining ring 124 to the receiving surface, thereby increasing the upper torque limit of the clutch assembly. In some examples, to facilitate assembly, modified input housing 144 may also include an alignment feature 312a that mates to an alignment feature 312b on retaining ring.

One exemplary embodiment of a method using kit 104 to enhance the performance of clutch assembly 100 may begin by detaching an OEM end-ring from an OEM housing assembly. Upon detaching the end-ring, one or more additional friction elements 116 and/or steel plates 120 can added to interleaved stack 112, thereby increasing the upper torque limit that clutch assembly can withstand. In some embodiments of the method, an entire OEM interleaved stack can be removed and replaced with interleaved stack 112 that includes additional friction elements 116 and/or steel plates 120.

This exemplary embodiment of the method may also include modifications to the OEM housing assembly so as to enhance upper torque limit that the clutch assembly can withstand. As explained above, upon detaching an OEM retaining ring, the OEM housing assembly can be modified to become modified housing assembly 144, in accordance with above disclosure, by fabricating a generally flat receiving surface 304 on an open end of the input housing. Retaining ring 128 may be attached to flat surface 304 using bolts 132.

As explained above, retaining ring 128 can improve the performance of a clutch assembly by at least two mechanisms. In one mechanism, an inner friction surface 128 may be configured to be in mechanical communication with a terminal element of the interleaved stack. The addition of this inner friction surface has the effect of adding an element to interleaved stack 112 without occupying the limited space within assembly housing 144. In another mechanism, the retaining ring can be attached to the modified input housing using bolts, rivets, welding, or other mechanical connect methods. Using these types of mechanical connections can provide a higher force threshold. These two embodiments also may be employed together.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of improving the performance of an OEM automatic transmission, said clutch assembly including an OEM input housing configured to receive an interleaved stack of a first number of friction elements and a first number of steel plates through an open end, and OEM clutch components within said housing comprising a piston acting through an apply-ring and apply-plate to press the interleaved stack against an end-ring, and return springs urging the apply-plate to a default position, said method comprising:
   removing the OEM clutch components from the OEM input housing;
   replacing the OEM input housing with a modified input housing having surface around the open end;
   inserting the OEM piston into the modified input housing;
   inserting a modified apply-plate and OEM apply ring into the input housing, the modified apply-plate having an annular recessed face configured to cooperate with the OEM apply-ring;
   inserting the first numbers of friction disks and plural steel plates in an interleaved stack into the modified input housing;
   inserting at least one additional steel plate into the modified input housing disposed in mating relationship with a terminal one of said first number of friction elements;
   inserting at least one additional friction element into the modified input housing disposed in mating relationship with said at least one additional steel plate to form in combination with said first number of friction elements and said first number of steel plates an extended interleaved stack, with said at least one additional friction element forming a new terminal friction element;
   enclosing the open end of the modified input housing with a retaining ring mounted to the receiving surface, the retaining ring having an inner side thereof adapted to directly receive forces applied through the clutch assembly; and
   inserting a plurality of modified return springs into the modified input housing prior to enclosing the open end, said modified return springs configured with sufficient length to be disposed between said retaining ring and said modified apply-plate to urge the apply-plate to the default position.

2. A method according to claim 1, wherein the modified input housing defines a space inside said flat receiving surface sufficient to receive an interleaved stack with an increased axial length including said first number of steel plates and first number of friction elements plus at least one additional steel plate and at least one additional friction element as a new terminal friction element.

3. A method according to claim 1, wherein said retaining ring includes an integrally formed, annular inner friction surface adapted to confront said terminal friction element to directly receive forces applied through the clutch assembly.

* * * * *